US008559169B2

(12) United States Patent
Takechi

(10) Patent No.: US 8,559,169 B2
(45) Date of Patent: Oct. 15, 2013

(54) FRAME CASING AND DISPLAY DEVICE

(75) Inventor: Yoshihiro Takechi, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 13/609,652

(22) Filed: Sep. 11, 2012

(65) Prior Publication Data

US 2013/0003273 A1    Jan. 3, 2013

Related U.S. Application Data

(63) Continuation of application No. 12/450,512, filed as application No. PCT/JP2008/055584 on Mar. 25, 2008, now Pat. No. 8,284,548.

(30) Foreign Application Priority Data

Mar. 30, 2007    (JP) .................................. 2007-090149

(51) Int. Cl.
*G06F 1/16*    (2006.01)

(52) U.S. Cl.
USPC ............ 361/679.26; 361/679.21; 361/679.22; 248/917

(58) Field of Classification Search
USPC ....................................... 361/679.21, 679.22
See application file for complete search history.

(56) References Cited

U.S. PATENT DOCUMENTS

| | | | |
|---|---|---|---|
| 5,754,259 A | 5/1998 | Nakamatsu et al. | |
| 5,927,668 A | 7/1999 | Cyrell | |
| 7,095,462 B2 * | 8/2006 | Ahn | 349/58 |
| 7,619,881 B1 * | 11/2009 | Granville et al. | 361/679.21 |
| 7,679,889 B2 * | 3/2010 | Sakata | 361/679.01 |
| 7,683,541 B2 * | 3/2010 | Sakata | 313/512 |
| 7,697,273 B2 * | 4/2010 | Kawano | 361/679.21 |
| 7,826,207 B2 | 11/2010 | Wang | |
| 7,936,413 B2 * | 5/2011 | Jeong et al. | 349/58 |
| 8,310,824 B2 * | 11/2012 | Dunn et al. | 361/679.21 |
| 8,427,598 B2 * | 4/2013 | Horie | 349/58 |
| 2001/0050732 A1 * | 12/2001 | Okamoto et al. | 349/58 |
| 2002/0067591 A1 * | 6/2002 | Tajima | 361/681 |

(Continued)

FOREIGN PATENT DOCUMENTS

| | | |
|---|---|---|
| JP | 2001-13888 A | 1/2001 |
| JP | 2003-5669 A | 1/2003 |

(Continued)

OTHER PUBLICATIONS

Notice of Allowance dated Jun. 7, 2012 in U.S. Appl. No. 12/450,512.

(Continued)

*Primary Examiner* — Anthony Q Edwards
(74) *Attorney, Agent, or Firm* — McGinn Intellectual Property Law Group, PLLC

(57) ABSTRACT

A display device includes a display section, a frame casing including first and second divided frames, each of the first and second divided frames including first and second holes along a width direction of the frame casing, the first hole being closer to a back surface of the display section than the second hole, the first and second divided frames being attached to the display section by screws passing through the second holes, and a glass plate provided between a front surface of the display section and the frame casing.

9 Claims, 4 Drawing Sheets

(56) References Cited

U.S. PATENT DOCUMENTS

| | | |
|---|---|---|
| 2003/0184958 A1 | 10/2003 | Kao |
| 2004/0212756 A1* | 10/2004 | Fukayama et al. ............... 349/58 |
| 2005/0117283 A1* | 6/2005 | Lee et al. ....................... 361/681 |
| 2005/0168954 A1* | 8/2005 | Kim ............................... 361/725 |
| 2006/0066768 A1 | 3/2006 | Lee et al. |
| 2006/0164567 A1* | 7/2006 | Fukayama et al. ............... 349/58 |
| 2006/0232915 A1* | 10/2006 | Chou et al. ................... 361/681 |
| 2007/0008687 A1 | 1/2007 | Fukuda |
| 2007/0127194 A1 | 6/2007 | She |
| 2008/0100770 A1* | 5/2008 | Chen et al. ...................... 349/58 |
| 2008/0129918 A1 | 6/2008 | Kim et al. |
| 2009/0027584 A1* | 1/2009 | Han et al. ........................ 349/58 |
| 2009/0205236 A1 | 8/2009 | Jordan |
| 2010/0073594 A1* | 3/2010 | Miyazaki ........................ 349/58 |

FOREIGN PATENT DOCUMENTS

| | | |
|---|---|---|
| JP | 2004-179207 A | 6/2004 |
| JP | 2004-233849 A | 8/2004 |
| JP | 2005-234180 A | 9/2005 |
| JP | 2006-201318 A | 8/2006 |
| JP | 2007-17835 A | 1/2007 |
| JP | 2007-298670 A | 11/2007 |

OTHER PUBLICATIONS

International Search Report (PTO/ISA/210) dated Apr. 22, 2008 in PCT/2008/055584.
Office Action dated Feb. 6, 2012 in U.S. Appl. No. 12/450,512.
Office Action dated Feb. 26, 2012 in U.S. Appl. No. 12/450,512.

\* cited by examiner

FRAME CASING AND DISPLAY DEVICE

TECHNICAL FIELD

The present application is a Continuation Application of U.S. patent application Ser. No. 12/450,512, filed on Sep. 29, 2009, which is based on and claims priority from Japanese patent application 2007-090149, filed on Mar. 30, 2007, the entire contents of which are incorporated herein by reference.

The present invention relates to a frame casing provided on side surfaces of a display section and a display device incorporating the same.

BACKGROUND ART

Various display devices, such as liquid crystal displays and plasma displays, have been used recently. These display devices usually include a rectangular display section, Various frame casings have been attached to side surfaces of the display section in the past (see, for example, Patent document 1).

There is known a frame casing in which divided frames, which are divided along a circumferential direction of the frame, are connected to one another and attached to side surfaces of a display section.

[Patent document 1] Japanese Unexamined Patent Application, First Publication No, 2006-201318

DISCLOSURE OF INVENTION

Problem to be Solved by the Invention

With the above-described frame casing, however, the divided frames in a state in which the divided frames are connected to one another cannot be attached to display sections if the display sections have a variation (tolerance) in size. There is a problem that, if the divided frames are able to be attached to the display section, the divided frames may be subject to excessive stress. If the divided frames expand or contract due to temperature changes in, for example, an outside environment, stress may concentrate on, for example, joint sections of the divided frames. As a result, there arises a problem in that the joint sections may be broken or damaged.

The frame casing not only holds and protects the display section, but affects the appearance of the display device as a design factor. Accordingly, there is also a problem that the design effectiveness may be impaired depending on the amount of expansion or contraction of the divided frames.

The present invention has been made in view of the aforementioned circumstances. An object of the present invention is to provide a frame casing and a display device with prolonged durability and long-term design effectiveness.

Means for Solving the Problem

In order to solve the foregoing problems, the present invention provides the following means.

A frame casing according to the present invention is provided on side surfaces of a display section, and includes: a plurality of divided frames which are L-shaped and disposed along the side surfaces of the display section with adjacent ends thereof along a circumferential direction overlapping one another; and a attaching section which is formed in a middle of a circumferential direction of each of the plurality of divided frames and which attaches the plurality of divided frames to the side surfaces of the display section, total length of the divided frames along the circumferential direction being greater than total length of the side surfaces of the display section along the circumferential direction.

With the frame casing according to the present invention, the plurality of divided frames are attached to the side surfaces of the display section so that the adjacent ends thereof along the circumferential direction overlap one another. The ends of the divided frames can therefore be expanded and contracted freely. With this configuration, durability can be improved. Moreover, even if the divided frames expand or contract, the side surfaces of the display section can be prevented from being exposed. Accordingly, design effectiveness can be maintained for prolonged periods.

In the frame casing according to the present invention, the divided frame may include an inner peripheral wall section at one end of the divided frame along the circumferential direction and at an inner circumferential side of the divided frame along a thickness direction of the divided frame, the inner peripheral wall section protruding along the circumferential direction of the divided frame.

With this configuration, the ends along the circumferential direction of the plurality of divided frames can be easily made to overlap one another.

In the frame casing according to the present invention, the divided frame may include: a base section disposed along the side surface of the display section; and a front wall section disposed at an end portion of the base section along a width direction thereof, the front wall section extending in a direction perpendicular to the base section so as to cover an edge portion in front of the display section.

With this configuration, the divided frames can be reliably attached to the side surfaces of the display section.

In the frame casing according to the present invention, the attaching section may be provided in a middle of the base section along the circumferential direction, and the attaching section may include a through hole in which a screw is inserted to be screwed into the side surface of the display section.

With this configuration, the divided frames can be easily attached to or removed from the side surfaces of the display section.

In the frame casing according to the present invention, the attaching section may be provided in a middle of the base section along the circumferential direction, and the attaching section may include a through hole in which a screw is inserted to be screwed into the side surface of the display section.

With this configuration, attaching positions of the divided frames can be adjusted easily.

In the frame casing according to the present invention, the base section may be brought into contact with and attached to the side surface of the display section.

With this configuration, the entire device can be made compact.

A display device according to the present invention includes a frame casing according to the present invention and the display section.

With the display device according to the present invention, similar advantageous effects as those of the frame casing of the present invention can be provided.

Effect of the Invention

According to the present invention, the ends of the divided frames along the circumferential direction overlap one another. Therefore, variation in the size of the display section and expansion and contraction of both ends of the divided frames can be tolerated. Accordingly, durability of the frame casing can be improved. Moreover, the total length of the plurality of divided frames along the circumferential direction is greater than the total length of the side surfaces of the display section. Accordingly, if the divided frames expand or contract, the side surfaces of the display section can be prevented from being exposed. Accordingly, the design effectiveness of the frame casing can be maintained for prolonged periods.

Figure 1:
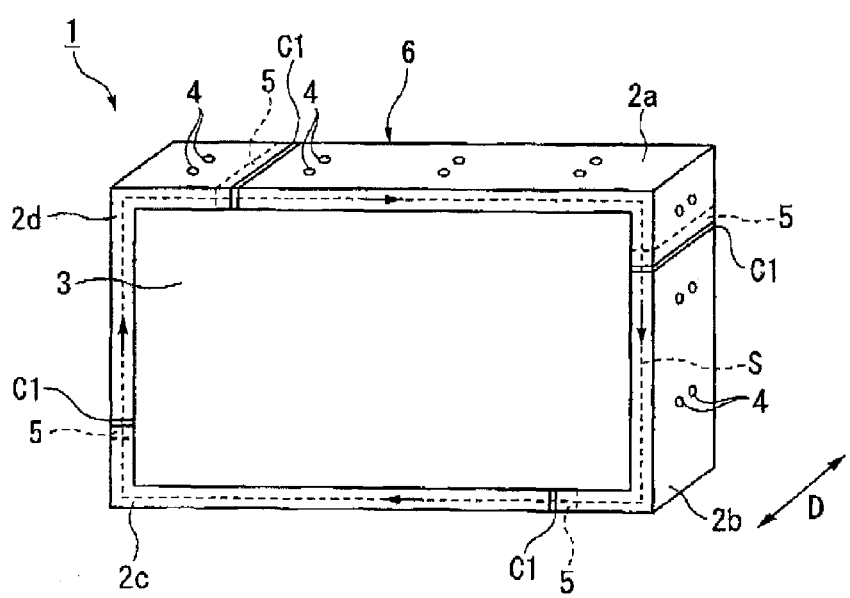
FIG. 1 is a perspective view illustrating a display device according to an exemplary embodiment of the present invention.

REFERENCE SYMBOLS 1 display device
2 divided frame
3 display section
4 through hole (attaching section)
6 frame casing
13 long base section (base section)
14 short base section (base section)
15 front wall section
20 inner peripheral wall section
22 fixing screw
D width direction
S circumferential direction

BEST MODE FOR CARRYING OUT THE INVENTION

Exemplary Embodiment

Hereinafter, a display device according to an exemplary embodiment of the present invention will be described with reference to the drawings.

Figure 2:
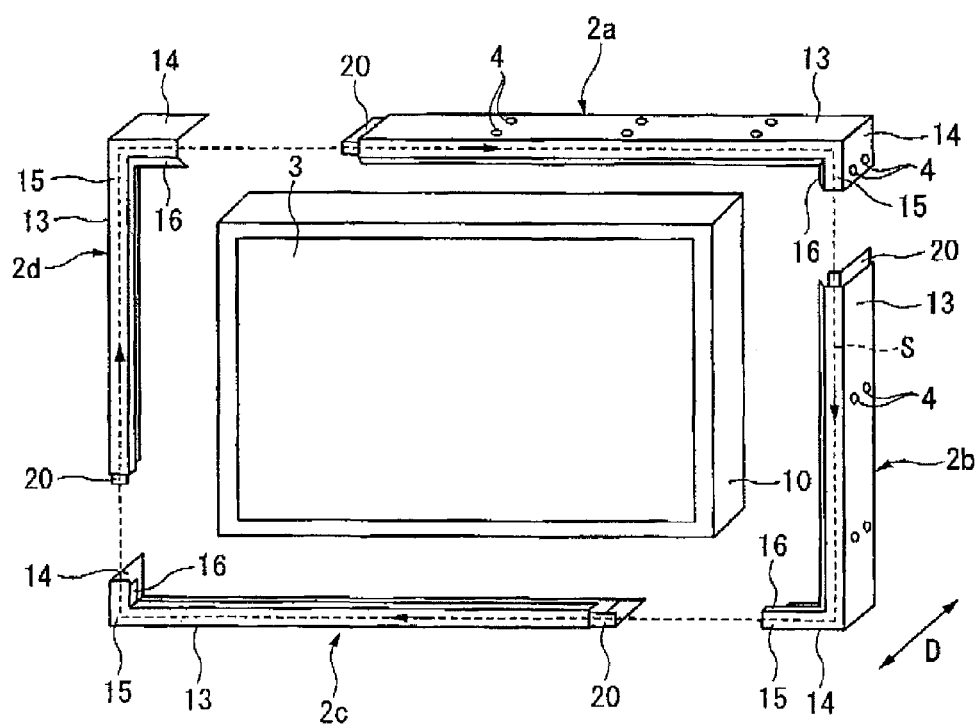
FIG. 2 is an exploded perspective view illustrating the display device in FIG. 1.

As illustrated in FIGS. 1 and 2, a display device 1 includes a rectangular parallelepiped-shaped display section 3 and a rectangular annular-shaped frame casing 6 which covers all the side surfaces of the display section 3.

The display section 3 may be, for example, a liquid crystal display or a plasma display. Screw holes, which are not illustrated, are formed on the side surfaces of the display section 3. As illustrated in FIG. 2, a rectangular annular-shaped protective frame 10 made of a metallic material is provided on the side surfaces of the display section 3. The protective frame 10 protects the display section 3. The protective frame 10 is disposed within the frame casing 6 and is therefore not exposed to the exterior. Through holes, which are not illustrated, are formed on the protective frame 10. The positions of the through holes correspond to the positions of the screw holes of the display section 3 when the protective frame 10 is assembled to the display section 3.

Figure 4:
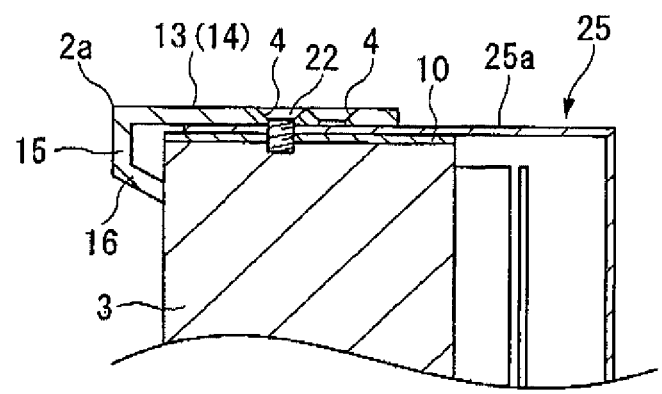
FIG. 4 is a cross-sectional view illustrating a part of the display device in FIG. 1 seen from a side surface.

As illustrated in FIG. 4, the protective frame 10 includes an L-shaped back cover 25 on the surface thereof. The back cover 25 has four side surfaces 25a along the side surfaces of the display section 3. Through holes, which are not illustrated, are provided on the side surfaces 25a of the back cover 25. The positions of the through holes correspond to the positions of the screw holes of the display section 3 when the back cover 25 is assembled to the display section 3. The back cover 25 constitutes the side surfaces of the display section 3. The back cover 25 is not illustrated in FIG. 2.

As illustrated in FIGS. 1 and 2, the frame casing 6 includes four resin-made divided frames 2a, 2b, 2c and 2d along a circumferential direction S. The divided frames 2a, 2b, 2c and 2d are L-shaped to cover corners of the display section 3.

The divided frames 2a, 2b, 2c and 2d include a long base section 13 (base section) and a short base section 14 (base section) expanding as rectangular plates. The length (longitudinal dimension) of the long base section 13 along the circumferential direction S is greater than the length of the short base section 14 along the circumferential direction S.

The circumferential direction S refers to a circumferential direction of the frame casing 6 when the divided frames 2a, 2b, 2c and 2d are attached to the display section 3 to form a rectangle annular configuration. The circumferential direction S used in the description of each of the divided frames 2a, 2b, 2c and 2d formed in an L-shape also refers to the circumferential direction when each of them is attached to the frame casing 6.

The long base section 13 and the short base section 14 are jointed together at one ends thereof along the circumferential direction S, and are perpendicular to each other.

The long base section 13 and the short base section 14 have through holes (attaching sections) 4 formed to penetrate the thickness direction thereof. A plurality of through holes 4 are provided at predetermined intervals along the circumferential direction S. A plurality of through holes 4 are also provided along a width direction D of the long base section 13 and the short base section 14.

The width direction D refers to a direction perpendicular to the circumferential direction S in the surfaces of the long base section 13 and the short base section 14 provided along the surface of the protective frame 10. The width direction D is a depth direction of the display section 3 in a state in which the frame casing 6 is attached to the display section 3.

The through holes 4 are formed in the middle of the circumferential direction S of the long base section 13 and the short base section 14. That is, the through holes 4 are not formed at the ends of the long base section 13 and the short base section 1 in the circumferential direction S.

At one end portion (long side portion) of the long base section 13 and the short base section 14 in the width direction D, there is provided an L-shaped front wall section 15 over the total length of the one end portion. The front wall section 15 extends along a direction perpendicular to the long base section 13 and the short base section 14. That is, the L-shaped front wall section 15 is provided along edges of the long base section 13 and the short base section 14. A folded wall section 16 folded at a predetermined angle with respect to the front wall section 15 is provided at one end portion (long side portion) of the front wall section 15. That is, the folded wall section 16 is provided along the edge of the front wall section 15 at a predetermined angle with respect to the front wall section 15. The long base section 13, the short base section 14, the front wall section 15 and the folded wall section 16 are formed integrally with one another.

Figure 3:
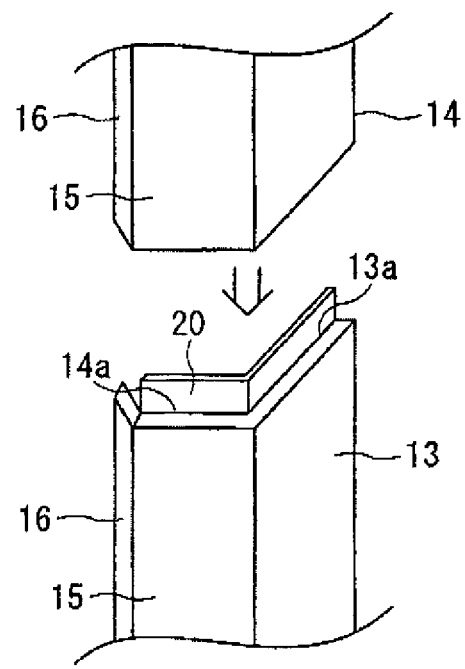
FIG. 3 is an explanatory view illustrating a method of overlapping end portions of divided frames illustrated in FIG. 1.

An inner peripheral wall section 20 is provided at the ends of the long base section 13 and the front wall section 15 along the circumferential direction S so as to protrude along the circumferential direction S. The thickness dimension of the inner peripheral wall section 20 is smaller than the thickness dimensions of the long base section 13 and the front wall section 15. That is, the inner peripheral wall section 20 is thinner than the long base section 13 and the front wall section 15. As illustrated in FIG. 3, the inner peripheral wall section 20 is provided at inner side sections 13a and 14a of an inner circumferential side among side portions of one ends in the thickness direction of the long base section 13 and the front wall section 15. The inner side surface of the inner peripheral wall section 20 is flash with the inner side surfaces of the long base section 13 and the front wall section 15.

The sum of the length (total length) of the long base sections 13 and the short base sections 14 of all the four divided frames 2a, 2b, 2c and 2d along the circumferential direction S is shorter than the sum of the length (total length) of all the side surfaces of the display section 3 along the circumferential direction. Accordingly, as illustrated in FIG. 1, when the divided frames 2a, 2b, 2c and 2d are attached to the side surfaces of the display section 3, a clearance C1 is formed along the circumferential direction S between the long base section 13 of the divided frame 2a and the short base section 14 of the divided frame 2d. Similarly, the clearance C1 is formed between the long base section 13 of the divided frame 2d and the short base section 14 of the divided frame 2c, between the long base section 13 of the divided frame 2c and the short base section 14 of the divided frame 2b, and between the long base section 13 of the divided frame 2b and the short base section 14 of the divided frame 2a.

The length (total length) obtained by adding the sum of the length of the long base sections 13 and the short base sections 14 of all the four divided frames 2a, 2b, 2c and 2d along the circumferential direction S to the sum of the length of the inner peripheral wall sections 20 of all the four divided frames 2a, 2b, 2c and 2d along the circumferential direction S is greater than the length (total length) of the side surfaces of the display section 3 along the circumferential direction. Accordingly, when the divided frames 2a, 2b, 2c and 2d are attached to the side surfaces of the display section 3, the ends of the divided frames 2a, 2b, 2c and 2d overlap one another in the thickness direction.

An operation of the display device 1 according to the thus-configured present exemplary embodiment will be described.

First, the divided frames 2a, 2b, 2c and 2d are disposed along the side surfaces 25a of the back cover 25 which constitutes the side surfaces of the display section 3. As illustrated in FIG. 3, the inner side surface of each divided frames 2a, 2b, 2c and 2d is brought into contact with the side surface 25a of the back cover 25 so that the end portions of the short base section 14 and the front wall section 15 are disposed outside of the inner peripheral wall section 20 which is adjacent to them along the circumferential direction S. At this time, the ends of the divided frames 2a, 2b, 2c and 2d overlap one another along the circumferential direction S. Moreover, as illustrated in FIG. 4, regarding the inner side surface of each divided frames 2a, 2b, 2c and 2d, the long base sections 13 and the short base sections 14 are brought into contact with the entire back cover 25, i.e., the four side surfaces 25a.

Next, fixing screws 22 are inserted in the screw holes of the display section 3 and fastened thereto via the through holes 4 at the front side, the through holes formed in the side surface 25a of the back cover 25 and the through holes formed in the protective frame 10. In this manner, the divided frames 2a, 2b, 2c and 2d are fixed to the side surfaces of the display section 3, and their outer surfaces are flush with each other. The clearance C1 is formed between the long base section 13 and the short base section 14 along the circumferential directions S. An inner peripheral wall section 20 is disposed in the clearance C1.

The front wall sections 15 cover the edge portions of the front surface of the display section 3 along the entire circumference. An end of the folded wall section 16 is brought into contact with the edge portion of the front surface of the display section 3.

In this manner, each of the divided frames 2a, 2b, 2c and 2d is attached to the side surfaces of the display section 3. No connecting portions for connecting the divided frames 2a, 2b, 2c and 2d are provided. Accordingly, the divided frames 2a, 2b, 2c and 2d are not connected together and are released from one another.

The frame casing 6 of the display device 1 may expand or contract due to temperature change of an outside environment.

Figure 5:
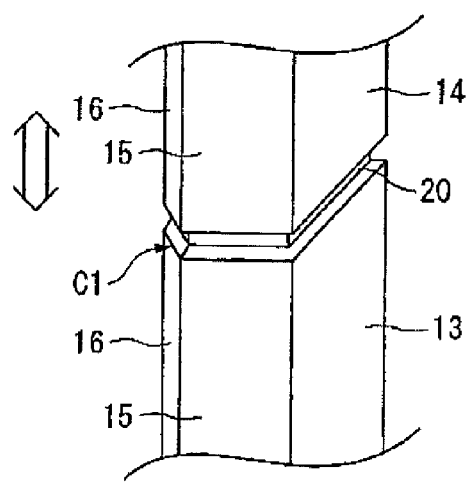
FIG. 5 is an explanatory view illustrating a situation of each of the divided frames being expanded or contracted.

In the display device 1 according to the present exemplary embodiment, the divided frames 2a, 2b, 2c and 2d are not connected together and the divided frames 2a, 2b, 2c and 2d are free from each other at the end portions along the circumferential direction S. Moreover, the clearance C1 is set to be longer than a distance of displacement of the divided frames 2a, 2b, 2c and 2d when expanded. Accordingly, as illustrated in FIG. 5, even if the divided frames 2a, 2b, 2c and 2d expand or contract, adjacent divided frames do not interfere with each other. That is, by forming the clearance C1, expansion and contraction of the divided frames 2a, 2b, 2c and 2d are allowed.

Since the total length of the divided frames 2a, 2b, 2c and 2d along the circumferential direction S is greater than the total length of the side surfaces of the display section 3, the ends of the divided frames 2a, 2b, 2c and 2d overlap one another. Moreover, the length of the inner peripheral wall section 20 at areas in which the divided frames 2a, 2b, 2c and 2d overlap one another is set to be greater than a distance of displacement of the divided frames 2a, 2b, 2c and 2d when contracted. Accordingly, even if the divided frames 2a, 2b, 2c and 2d contract, the side surfaces of the display section 3 are not exposed to the outside. That is, even if the divided frames 2a, 2b, 2c and 2d expand or contract, only a degree of exposure of the inner peripheral wall section 20 is varied and the side surfaces of the display section 3 are still covered with the divided frames 2a, 2b, 2c and 2d.

The above-described configuration which allows expansion and contraction of the divided frames 2a, 2b, 2c and 2d also tolerates variation in size of the display section 3. That is, the total length of the side surfaces of the display section 3 along the circumferential direction may be varied. The variation is tolerated by controlling the areas where the divided frames 2a, 2b, 2c and 2d overlap one another. In particular, since the divided frames 2a, 2b, 2c and 2d are formed in L-shape, any variation occurring in any side of the display section 3 can be tolerated.

Figure 6:
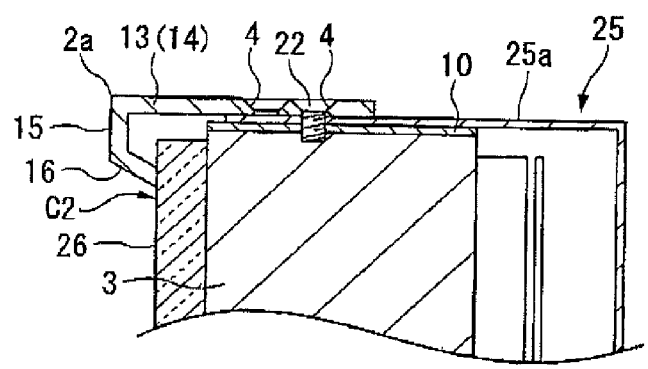
FIG. 6 is a cross-sectional view illustrating a situation of a protective glass being disposed in front of the display section in FIG. 4.

As illustrated in FIG. 6, if a protective glass 26 is disposed in front of the display section 3, the divided frames 2a, 2b, 2c and 2d are attached via the fixing screws 22 inserted through the through holes 4 at the rear side. Accordingly, a clearance C2 is formed between an end of the folded wall section 16 and the front surface of the display section 3. The protective glass 26 is disposed in the clearance C2.

As described above, with the display device 1 according to the present exemplary embodiment, even if size of the display section 3 varies or the divided frames 2a, 2b, 2c and 2d expand or contract due to temperature change, the divided frames 2a, 2b, 2c and 2d do not interfere with each other.

Accordingly, durability of the frame casing 6 can be improved. With the inner peripheral wall section 20 being provided, even if the divided frames 2a, 2b, 2c and 2d expand or contract, the side surfaces of the display section 3 can be prevented from being exposed. Accordingly, the design effectiveness of the frame casing 6 can be maintained for prolonged periods. Since the inner peripheral wall section 20 enables the outer surfaces of the divided frames 2a, 2b, 2c and 2d to be flush with each other, the design effectiveness of the frame casing 6 can further be improved.

Inner surfaces of the divided frames 2a, 2b, 2c and 2d are brought into contact with the side surfaces of the display section 3 and are attached only by the fixing screws 22. Thus, the number of attaching parts can be reduced without sacrificing attaching strength. Accordingly, the entire display device 1 can be made further compact.

The divided frames 2a, 2b, 2c and 2d can be attached to or removed from only by the fixing screws 22. Accordingly, the frame casing 6 can be attached rapidly and easily. The protective glass 26 can be attached to or removed from with a lessened burden.

The back cover 25 is provided in the above-described exemplary embodiment, but the present invention is not limited thereto. No back cover 25 may be provided at all. With this configuration, the entire display device can be made further compact.

The technical range of the present invention is not limited to the above-described exemplary embodiment. Various modifications can be made without departing from the scope of the present invention.

INDUSTRIAL APPLICABILITY

The present invention can be applied to a frame casing provided on side surfaces of a display section and to a display device incorporating the same. According to the present invention, a frame casing with prolonged durability and long-term design effectiveness can be provided.

The invention claimed is:
1. A display device, comprising:
  a display section;
  a frame casing comprising first and second divided frames, each of the first and second divided frames comprising first and second holes along a width direction of the frame casing, the first hole being closer to a back surface of the display section than the second hole, the first and second divided frames being attached to the display section by screws passing through the second holes; and
  a glass plate provided between a front surface of the display section and the frame casing.
2. The display device according to claim 1, wherein the first divided frame comprises:
  a first base section comprising first and second ends;
  a second base section connected to the first end; and
  a wall section provided at the second end,
  wherein the second divided frame comprises:
    a third base section; and
    a fourth base section connected to the third base section,
  wherein the first and second divided frames are disposed on side surfaces of the display section such that the fourth base section overlaps with at least a portion of the wall section, and
  wherein a clearance is formed between the first base section and the fourth base section along a circumferential direction of the display section.
3. The display device according to claim 2, wherein the first divided frame further comprises:
  a first front wall section, the first front wall section comprising an inwardly folded section,
  wherein the second divided frame further comprises:
    a second front wall section, the second front wall section also comprising an inwardly folded section, and
  wherein the glass plate is provided between the display section and the first front wall section and further between the display section and the second front wall section.
4. The display device according claim 1, wherein the glass plate comprises a protective glass.
5. The display device according to claim 1, wherein the frame casing is attached to and removed from the display section only by said screws.
6. The display device according to claim 1, wherein the first divided frame comprises:
  a first front wall section, the first front wall section comprising an inwardly folded section, and
  wherein the second divided frame comprises:
    a second front wall section, the second front wall section also comprising an inwardly folded section.
7. The display device according to claim 6, wherein the glass plate is provided between the display section and the first front wall section and further between the display section and the second front wall section.
8. The display device according to claim 1, wherein the first divided frame comprises:
  a first front wall section, the first front wall section comprising an inwardly folded section,
  wherein the second divided frame comprises:
    a second front wall section, the second front wall section also comprising an inwardly folded section, and
  wherein the glass plate is provided between the display section and the inwardly folded section of the first wall section and further between the display section and the inwardly folded section of the second wall section.
9. The display device according to claim 1, wherein the width direction comprises a depth direction of the display section in a state in which the frame casing is attached to the display section.

* * * * *